Figure 1:
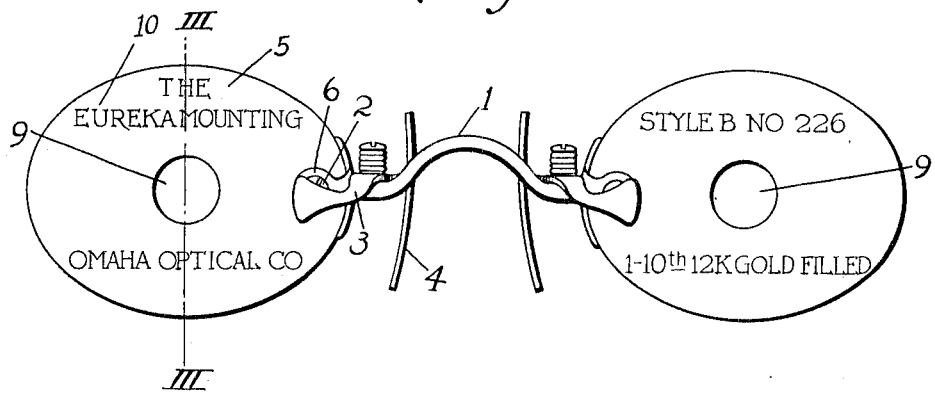
Figure 2:
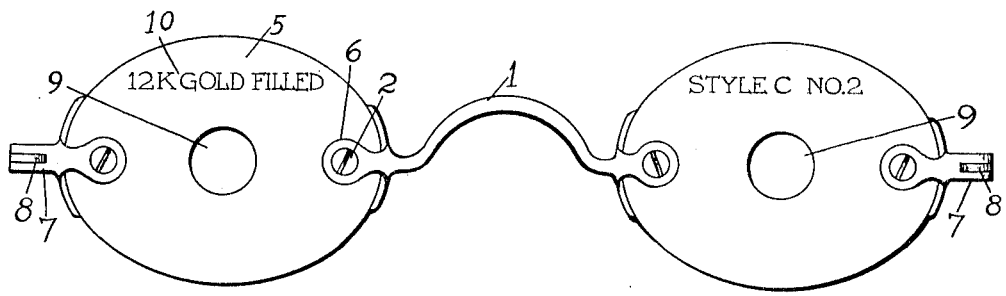
Figure 3:
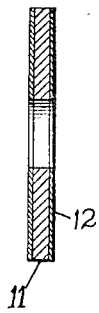

E. RIGGS.
LENS SUBSTITUTE FOR USE WITH TRIAL EYEGLASS MOUNTINGS OR THE LIKE.
APPLICATION FILED APR. 19, 1912.

1,090,232.

Patented Mar. 17, 1914.

WITNESSES:
Joseph J. Demers
Reginald H. Waters

INVENTOR
ELWOOD RIGGS

By H. H. Stytt & H. K. Parsons
ATTORNEYS

UNITED STATES PATENT OFFICE.

ELWOOD RIGGS, OF OMAHA, NEBRASKA.

LENS SUBSTITUTE FOR USE WITH TRIAL EYEGLASS-MOUNTINGS OR THE LIKE.

1,090,232.

Specification of Letters Patent.

Patented Mar. 17, 1914.

Application filed April 19, 1912. Serial No. 691,884.

*To all whom it may concern:*

Be it known that I, ELWOOD RIGGS, a citizen of the United States, residing at Omaha, in the county of Douglas and State of Nebraska, have invented certain new and useful Improvements in Lens Substitutes for Use with Trial Eyeglass-Mountings or the like, of which the following is a specification.

My invention relates to improvements in lenses, and has particular reference to an improved substitute which may be employed to take the place of the ordinary blank glass lenses now used by opticians in trial sets or other mountings used exclusively for fitting, shipping or demonstrating purposes.

Ordinarily in the case of mountings which are employed for fitting purposes or for demonstrating purposes, the same are equipped with blank glass lenses, in some instances these lenses being absolutely blank while in other instances the lenses have etched thereon the name of the mounting, the style or other data of this character. In employing the mounting equipped with such lenses for fitting a customer or for demonstrating the clinging qualities of any particular guard, the customer or person interested will naturally attempt to shake off or dislodge the mounting in order to determine whether it is the one adapted to their particular individual requirements. While in some instances the glasses so shaken off are caught it frequently happens that the same fall onto the counter or onto the floor and the lenses with which they are equipped are broken. Unfortunately, however, the mounting must be equipped with lenses when being tested, as it is the weight of the lenses pulling against the guard or other holding members of the mounting which determine the actual practical wearing value of the mounting to a person. It will be understood that the replacing of the lenses broken by dropping of the mounting entails some considerable expense, as well as occupying quite a little time and causing a great deal of annoyance particularly when it is desired to again try on the mounting soon after the lens has been broken as it means that both the customer and optician or oculist must wait while the lens is being replaced. A further difficulty is frequently met with by the oculist or optician, in that the tags with which mountings are ordinarily equipped being made of thin paper readily become torn and thus detached from the mounting and thus render it difficult to determine the exact measurement and size of the mounting, while as before mentioned the etching of these matters on the ordinary glass lenses used in such mountings is at the best an expensive process. Another difficulty in fitting eyeglasses is possibly more annoying to the customer than to the optician, that is, an eyeglass mounting which may fit very satisfactorily on the nose of the prospective purchaser will be of such construction and size as to either require extremely large lenses in order that the lenses may be centered at the correct pupilary distance or may even be of such a size that it is impossible to center the lenses with the pupils of the eye. This is a feature which is frequently overlooked even by those who are considered to be expert opticians.

It is the purpose and intention of my present invention to obviate all of the difficulties before mentioned. In order to accomplish this result, I have formed the blank to be fitted in the mounting from any suitable material which from its toughness and durability may be termed infrangible. Among the materials suitable for this purpose may be mentioned pasteboard, cardboard and celluloid. I prefer to employ one of these substances since the weight of a lens blank formed for one of these substances is approximately the same as the weight of an ordinary lens and since blanks from these substances may be manufactured at a very slight cost. Another advantage of these substances is that suitable matter of an advertising nature or a description of the characteristics and the measurement or size of the mounting may be readily placed upon such lens blank and thus become a permanent part of the mounting which cannot under ordinary circumstances become detached therefrom.

Other objects and advantages of my improved blank or lens substitute will be readily apparent by reference to the foregoing description taken in connection with the accompanying drawing, and it will be understood that I may make any variation in the specific details of construction hereinafter described within the scope of the appended claims without departing from or exceeding the spirit of my invention.

Figure I represents a front elevation of a finger piece eyeglass mounting having my improved lens blank secured within the lens clips of the mounting. Fig. II represents a similar view of a rimless spectacle mounting showing the bridge and the temples attached to my improved lens blank, and Fig. III represents a sectional view on the line III—III of Fig. I.

In Fig. I of the drawing I have illustrated an ordinary finger piece mounting comprising the bridge 1, said bridge having at each end a lens clip 6 and having adjacent its ends the finger piece levers 3 bearing guards 4 for securing the mounting in position upon the face. Secured within the lens clips 2 are my improved lens members 5 retained in position by the usual lens screws 2.

In Fig. II I have shown a spectacle bridge 1 having at its ends the usual lens clips 6, while secured to the outer edges of the lenses 5 are the end pieces 7 for the usual temples 8.

In the use of those forms of my invention illustrated in Figs. I and II, the mounting is placed on the face of the person to be fitted in the usual manner, the weight of my lenses 5, Fig. I, serving to determine whether or not the mounting takes a sufficiently secure grip upon the nose of the wearer, while in Fig. II my improved lenses serve to take the place of ordinary glass lenses and connect the bridge and the temples. In either event the mounting having been placed in position upon the face of the wearer the optician or fitter can readily determine whether it is the correct mounting and by glancing at the apertures 9 formed substantially centrally of my lenses 5 he can at once perceive whether said apertures are disposed in alinement with the pupils of the eyes of the person being fitted. If the pupils show through the said apertures the fitter then knows that the mounting which he is then trying gives approximately the correct pupilary distance and that the eyes will be disposed at the focal centers of the lenses when the mounting of that size is fitted with the necessary corrective lenses. Should the pupils not be visible in substantially the centers of the apertures 9 the fitter can calculate the amount of displacement necessary to give the lenses, or else he can try other sizes and styles of mountings until a mounting is found which holds the lenses with the apertures 9 in correct relation to the pupils of the eyes of the person being fitted. Aside from the advantage possessed by these apertures 9 and the assistance they give in fitting the mounting these apertures serve a second purpose, in that they admit light to the eyes of the person being fitted and prevent said person from being blinded when the mounting with the lenses is placed in position on their face as would occur were not said apertures present, the lens members 5 ordinarily being formed from an opaque material.

It will be observed by reference to the drawings that I have shown as placed upon the outer face of the lens members 5 the configurations 10 which form rows of advertising or identification marks whereby all facts necessary to be known in connection with the mounting, such as patent dates, price legends and contracts, and the size and character of the mounting may be displayed. It will be understood that while I have shown but little lettering on the lenses 5 they are of such size as to receive almost any desired amount of lettering.

In that embodiment of my invention which is illustrated in Fig. III it will be observed that I have shown the same as composed of three distinct layers, although it will of course be understood that one, two or any other desired number of layers may be employed as appears to be most desirable. The purpose of having the lens member 5 in more than one layer is as follows. In the illustration shown I have employed a base formed preferably of cardboard or pasteboard. This base 11 has imprinted or impressed thereon the configurations 10 shown in Figs. I and II, and the entire blank is then dipped into a suitable solution of varnish, liquid celluloid or other like material which will so coat the face of the member 11 with the coating 12 as to entirely protect the configurations 10 from any alteration or obliteration, while also tending to make a smoother and thus a cleaner surface on the member 5 to add to its ornamental and attractive appearance. While I have spoken of this coating 12 as being applied by dipping the portion 11 thereinto it will be understood that this may be placed on the portion 11 with a brush or in any other suitable and desired manner. When forming the member of the body 5 of celluloid, this being a transparent substance may have secured to one face thereof a coating 12 of paper or like opaque material on which the desired configurations 10 have already been printed, the said configurations then showing through the celluloid which forms a protecting facing therefor as will be readily understood.

I claim:

1. In an eye glass mounting the combination with a lens clip of an imitation lens having a portion fitting within the clip and retained in position by the lens screw, said lens being formed from relatively infrangible material on which configurations may be readily printed, and having an aperture formed therein at the center thereof, the outer portion of the member being provided with configurations.

2. In a spectacle mounting the combination with a bridge and an end piece each provided with a lens clip of a member connecting the bridge and end piece, said connecting member being formed of relatively infrangible material shaped in the simulation of a lens having portions fitting into the lens clips and held therein by the lens screw, said connecting member bearing suitable designations on one face thereof.

3. An improved article of manufacture, a lens substitute for use in a spectacle mounting, comprising a body portion of infrangible material, having a central sight aperture formed therethrough, said member being formed into the shape of a lens and bearing configurations on one face thereof, and a transparent member of the size and shape of the body member permanently fixed to that face on which the configurations are located.

In testimony whereof I affix my signature in presence of two witnesses.

ELWOOD RIGGS.

Witnesses:
G. M. MATTSON,
R. M. WAHLGREN.

Copies of this patent may be obtained for five cents each, by addressing the "Commissioner of Patents, Washington, D. C."